United States Patent
He et al.

(10) Patent No.: US 10,568,147 B2
(45) Date of Patent: Feb. 18, 2020

(54) UPLINK SPECIFIC BACKOFF INDICATOR

(71) Applicant: QUALCOMM Incorporated, San Diego, CA (US)

(72) Inventors: Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 15/954,468

(22) Filed: Apr. 16, 2018

(65) Prior Publication Data

US 2019/0150192 A1     May 16, 2019

Related U.S. Application Data

(60) Provisional application No. 62/587,243, filed on Nov. 16, 2017.

(51) Int. Cl.
*H04W 74/08* (2009.01)
*H04W 92/10* (2009.01)

(52) U.S. Cl.
CPC .......... *H04W 74/085* (2013.01); *H04W 92/10* (2013.01)

(58) Field of Classification Search
CPC .. H04W 74/006; H04W 74/085; H04W 92/10
USPC ........................................................ 370/329
See application file for complete search history.

(56) References Cited

U.S. PATENT DOCUMENTS

| | | | |
|---|---|---|---|
| 2010/0232364 A1* | 9/2010 | Hsu | H04W 74/085 370/328 |
| 2012/0300714 A1 | 11/2012 | Ng et al. | |
| 2012/0314652 A1 | 12/2012 | Ahn et al. | |
| 2014/0092855 A1* | 4/2014 | Ahn | H04W 74/0833 370/329 |
| 2016/0073292 A1* | 3/2016 | Fan | H04W 28/06 370/230 |
| 2016/0143059 A1* | 5/2016 | Jha | H04W 76/10 370/329 |
| 2017/0311344 A1* | 10/2017 | Lee | H04W 56/00 |
| 2017/0332410 A1* | 11/2017 | Babaei | H04W 74/0833 |
| 2018/0007590 A1* | 1/2018 | Karout | H04W 74/0833 |
| 2018/0270866 A1* | 9/2018 | Loehr | H04L 1/188 |
| 2018/0317263 A1* | 11/2018 | Ishii | H04W 74/0833 |
| 2018/0343673 A1* | 11/2018 | Chen | H04W 74/006 |
| 2019/0098667 A1* | 3/2019 | Lai | H04W 72/14 |
| 2019/0166539 A1* | 5/2019 | Chen | H04W 36/36 |

FOREIGN PATENT DOCUMENTS

EP     2442470 A2    4/2012

OTHER PUBLICATIONS

International Search Report and Written Opinion—PCT/US2018/059840—ISA/EPO—dated Jan. 28, 2019.

* cited by examiner

*Primary Examiner* — Robert J Lopata
(74) *Attorney, Agent, or Firm* — Patterson & Sheridan, LLP

(57) ABSTRACT

Certain aspects of the present disclosure provide techniques for providing an uplink specific backoff indicator in a wireless communication network.

22 Claims, 11 Drawing Sheets

UPLINK SPECIFIC BACKOFF INDICATOR

CROSS-REFERENCE TO RELATED APPLICATIONS

This application claims the benefit of U.S. Provisional Patent No. 62/587,243, filed Nov. 16, 2017. The content of the provisional application is hereby incorporated by reference in its entirety.

INTRODUCTION

Aspects of the present disclosure relate to wireless communications, and more particularly, to techniques for providing an uplink specific backoff indicator in a wireless communication network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes receiving, by a user equipment from a base station, a media access control (MAC) random access response (RAR) protocol data unit (PDU), wherein the MAC RAR PDU includes one or more RARs, each of the one or more RARs being associated with a single uplink, wherein the MAC RAR PDU is associated with a random access-radio network temporary identifier (RA-RNTI) that is calculated at least in part based on an index of the single uplink, wherein the MAC RAR PDU further includes a backoff indicator associated with the single uplink; determining, by the user equipment, the backoff indicator is associated with the single uplink based on the RA-RNTI associated with the MAC RAR PDU; backing off, by the user equipment, from performing a random access procedure for accessing the single uplink for a time period based on the backoff indicator; and performing, by the user equipment, the random access procedure for accessing the single uplink after the time period.

Certain aspects provide a method for wireless communication. The method generally includes receiving, by a user equipment from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment; determining, by the user equipment, a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink; backing off, by the user equipment, from performing a random access procedure for accessing the first uplink for a time period based on the first backoff indicator; and performing, by the user equipment, the random access procedure for accessing the first uplink after the time period.

Certain aspects provide a method for wireless communication. The method generally includes receiving, by a user equipment from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks; determining, by the user equipment, a first backoff indicator of the plurality of backoff indicators is associated with a first uplink of the plurality of uplinks based on a first MAC subheader of the plurality of MAC subheaders including the first backoff indicator and an indicator of the first uplink; backing off, by the user equipment, from performing a random access procedure for accessing the first uplink for a time period based on the first backoff indicator; and performing, by the user equipment, the random access procedure for accessing the first uplink after the time period.

Certain aspects provide a user equipment. The user equipment comprises a memory and a processor coupled to the memory. The processor is configured to receive, from a base station, a media access control (MAC) random access response (RAR) protocol data unit (PDU), wherein the MAC RAR PDU includes one or more RARs, each of the one or more RARs being associated with a single uplink, wherein the MAC RAR PDU is associated with a random access-radio network temporary identifier (RA-RNTI) that is calculated at least in part based on an index of the single uplink, wherein the MAC RAR PDU further includes a backoff indicator associated with the single uplink. The processor is configured to determine the backoff indicator is associated with the single uplink based on the RA-RNTI associated with the MAC RAR PDU. The processor is configured to back off from performing a random access procedure for accessing the single uplink for a time period based on the backoff indicator. The processor is configured to perform the random access procedure for accessing the single uplink after the time period.

Certain aspects provide a user equipment. The user equipment comprises a memory and a processor coupled to the memory. The processor is configured to receive, from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment. The processor is configured to determine a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink. The processor is configured to back off from performing a random access procedure for accessing the first uplink for a time period based on the first backoff indicator. The processor is configured to perform the random access procedure for accessing the first uplink after the time period.

Certain aspects provide a user equipment. The user equipment comprises a memory and a processor coupled to the memory. The processor is configured to receive, from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks. The processor is configured to determine a first backoff indicator of the plurality of backoff indicators is associated with a first uplink of the plurality of uplinks based on a first MAC subheader of the plurality of MAC subheaders including the first backoff indicator and an indicator of the first uplink. The processor is configured to back off from performing a random access procedure for accessing the first uplink for a time period based on the first backoff indicator. The processor is configured to perform the random access procedure for accessing the first uplink after the time period.

Certain aspects provide a user equipment. The user equipment comprises means for receiving, from a base station, a media access control (MAC) random access response (RAR) protocol data unit (PDU), wherein the MAC RAR PDU includes one or more RARs, each of the one or more RARs being associated with a single uplink, wherein the MAC RAR PDU is associated with a random access-radio network temporary identifier (RA-RNTI) that is calculated at least in part based on an index of the single uplink, wherein the MAC RAR PDU further includes a backoff indicator associated with the single uplink. The user equipment comprises means for determining the backoff indicator is associated with the single uplink based on the RA-RNTI associated with the MAC RAR PDU. The user equipment comprises means for backing off, by the user equipment, from performing a random access procedure for accessing the single uplink for a time period based on the backoff indicator. The user equipment comprises means for performing, by the user equipment, the random access procedure for accessing the single uplink after the time period.

Certain aspects provide a user equipment. The user equipment comprises means for receiving, from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment. The user equipment comprises means for determining a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink. The user equipment comprises means for backing off from performing a random access procedure for accessing the first uplink for a time period based on the first backoff indicator. The user equipment comprises means for performing the random access procedure for accessing the first uplink after the time period.

Certain aspects provide a user equipment. The user equipment comprises means for receiving, from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks. The user equipment comprises means for determining a first backoff indicator of the plurality of backoff indicators is associated with a first uplink of the plurality of uplinks based on a first MAC subheader of the plurality of MAC subheaders including the first backoff indicator and an indicator of the first uplink. The user equipment comprises means for backing off from performing a random access procedure for accessing the first uplink for a time period based on the first backoff indicator. The user equipment comprises means for performing the random access procedure for accessing the first uplink after the time period.

Certain aspects provide a computer readable medium having instructions stored thereon for causing a user equipment to perform a method for wireless communication. The method generally includes receiving, by a user equipment from a base station, a media access control (MAC) random access response (RAR) protocol data unit (PDU), wherein the MAC RAR PDU includes one or more RARs, each of the one or more RARs being associated with a single uplink, wherein the MAC RAR PDU is associated with a random access-radio network temporary identifier (RA-RNTI) that is calculated at least in part based on an index of the single uplink, wherein the MAC RAR PDU further includes a backoff indicator associated with the single uplink; determining, by the user equipment, the backoff indicator is associated with the single uplink based on the RA-RNTI associated with the MAC RAR PDU; backing off, by the user equipment, from performing a random access procedure for accessing the single uplink for a time period based on the backoff indicator; and performing, by the user equipment, the random access procedure for accessing the single uplink after the time period.

Certain aspects provide a computer readable medium having instructions stored thereon for causing a user equipment to perform a method for wireless communication. The method generally includes receiving, by a user equipment from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment; determining, by the user equipment, a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink; backing off, by the user equipment, from performing a random access procedure for accessing the first uplink for a time period based on the first backoff indicator; and performing, by the user equipment, the random access procedure for accessing the first uplink after the time period.

Certain aspects provide a computer readable medium having instructions stored thereon for causing a user equipment to perform a method for wireless communication. The method generally includes receiving, by a user equipment from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks; determining, by the user equipment, a first backoff indicator of the plurality of backoff indicators is associated with a first uplink of the plurality of uplinks based on a first MAC subheader of the plurality of MAC subheaders including the first backoff indicator and an indicator of the first uplink; backing off, by the user equipment, from performing a random access procedure for accessing the first uplink for a time period based on the first backoff indicator; and performing, by the user equipment, the random access procedure for accessing the first uplink after the time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
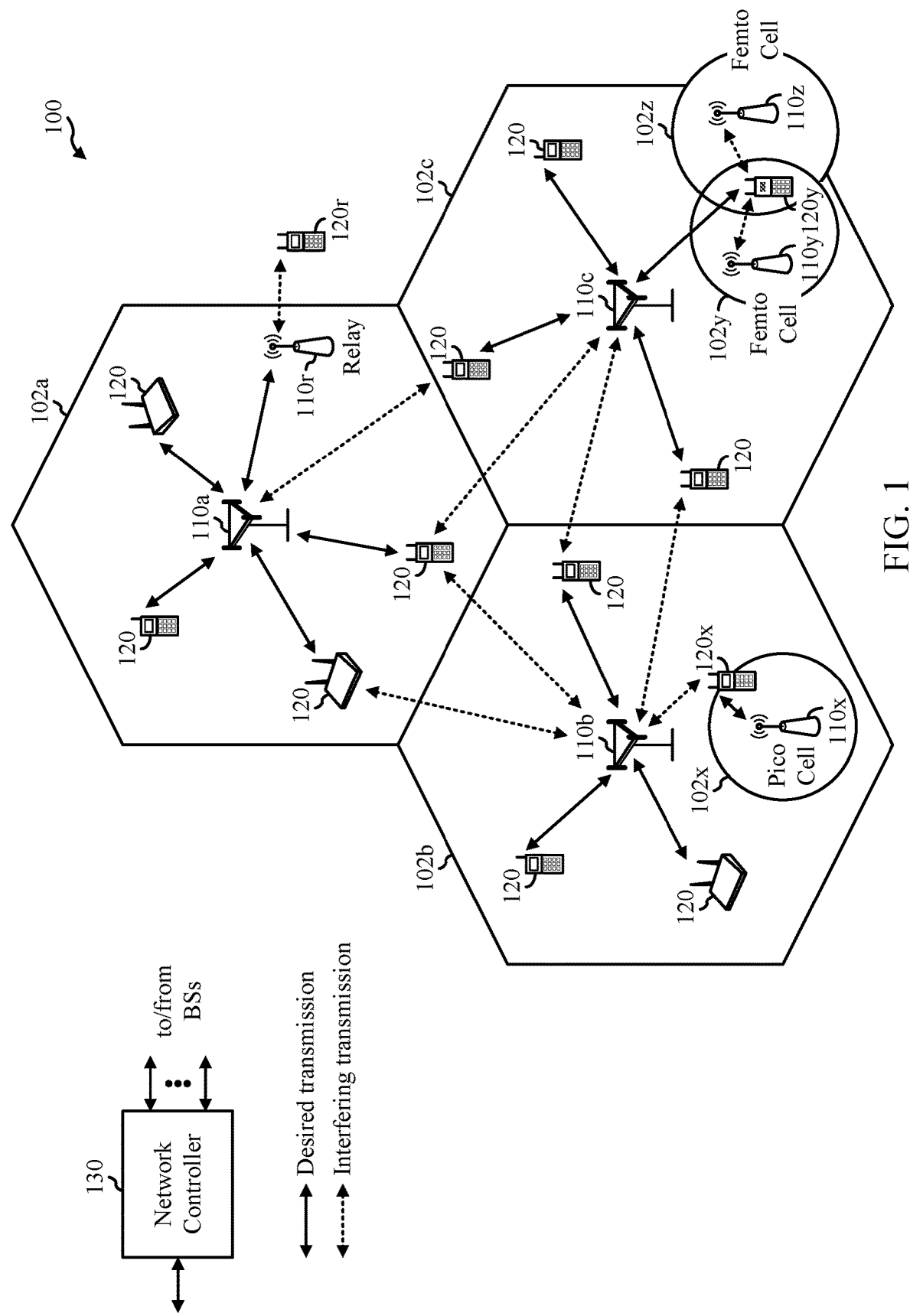
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technologies).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to supplementary uplink (SUL) random access channel (RACH) procedures. More particularly, aspects of the present disclosure relate to providing a backoff indicator specific to an uplink of multiple uplinks of a UE for performing random access.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. UEs 120 may be configured to perform operations and methods described herein. The BS 110 may perform complementary operations to the operations performed by the UE 120.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
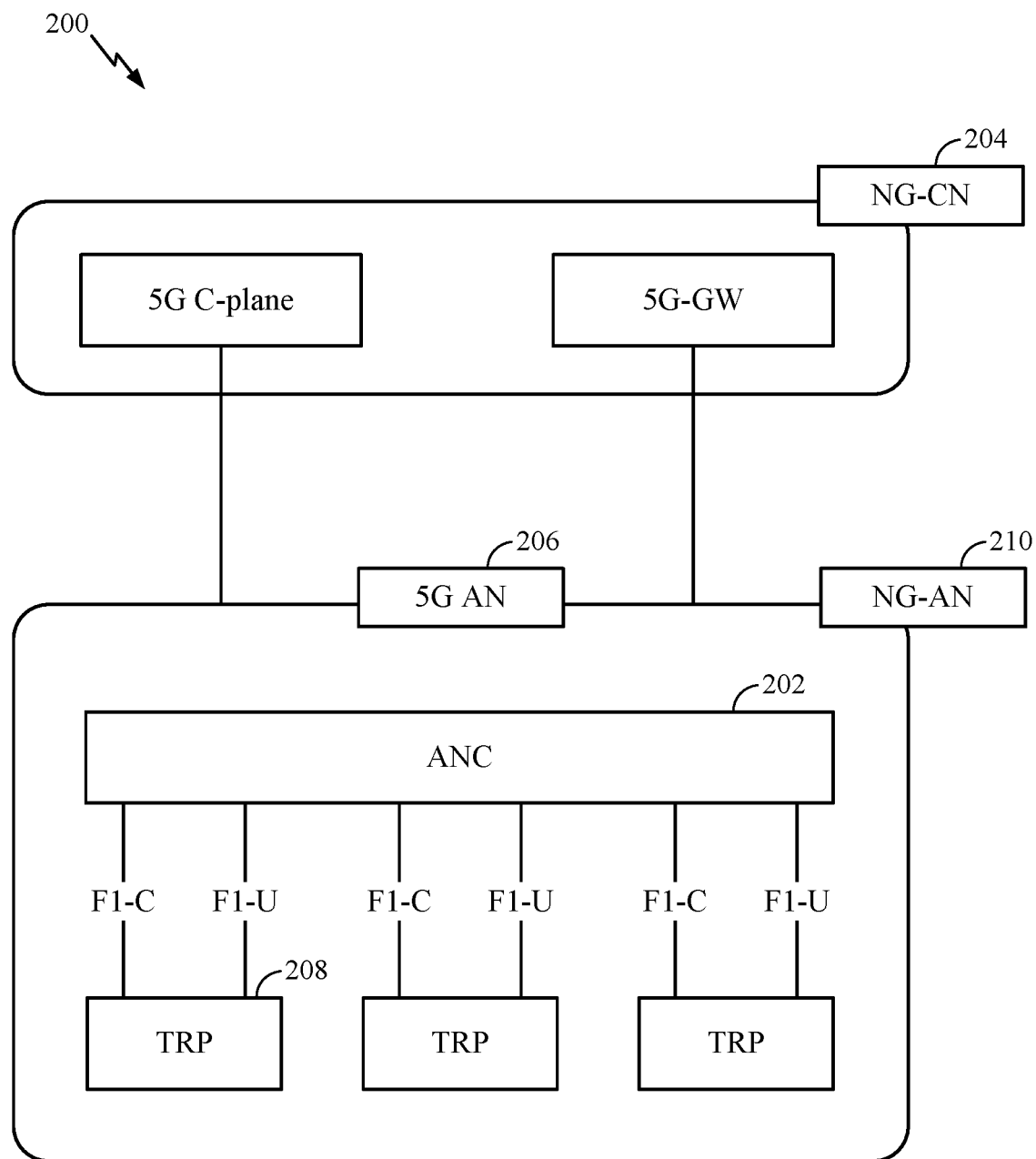
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
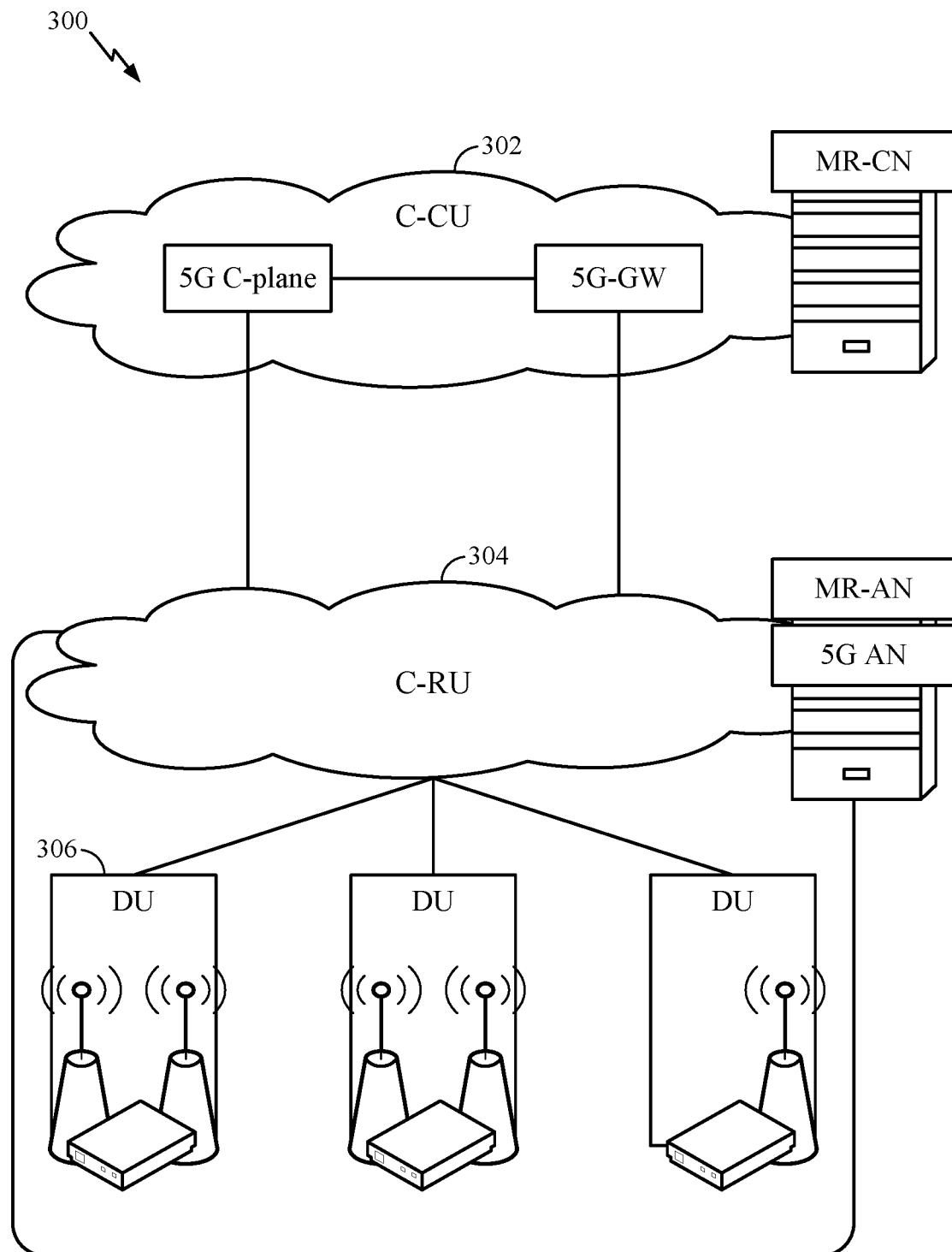
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
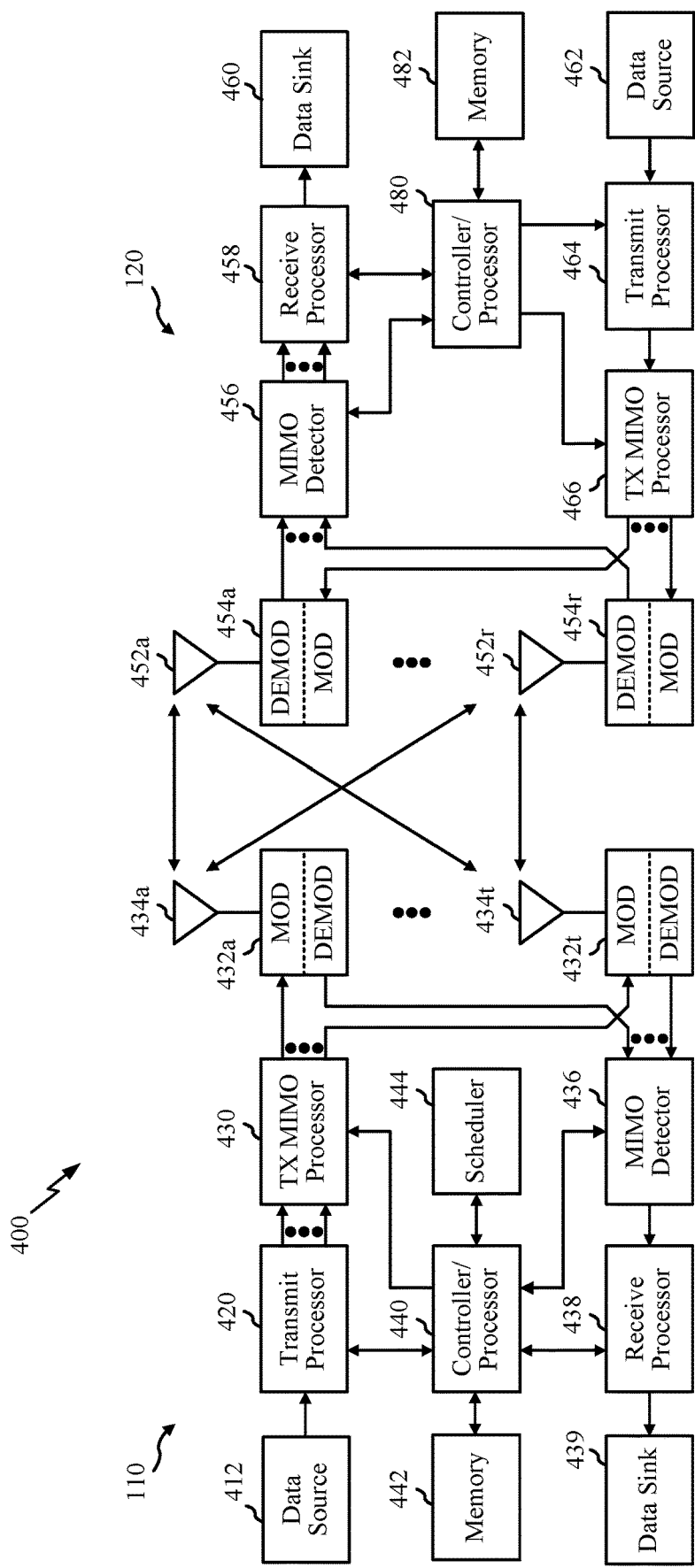
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform operations described herein and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, the execution of processes and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
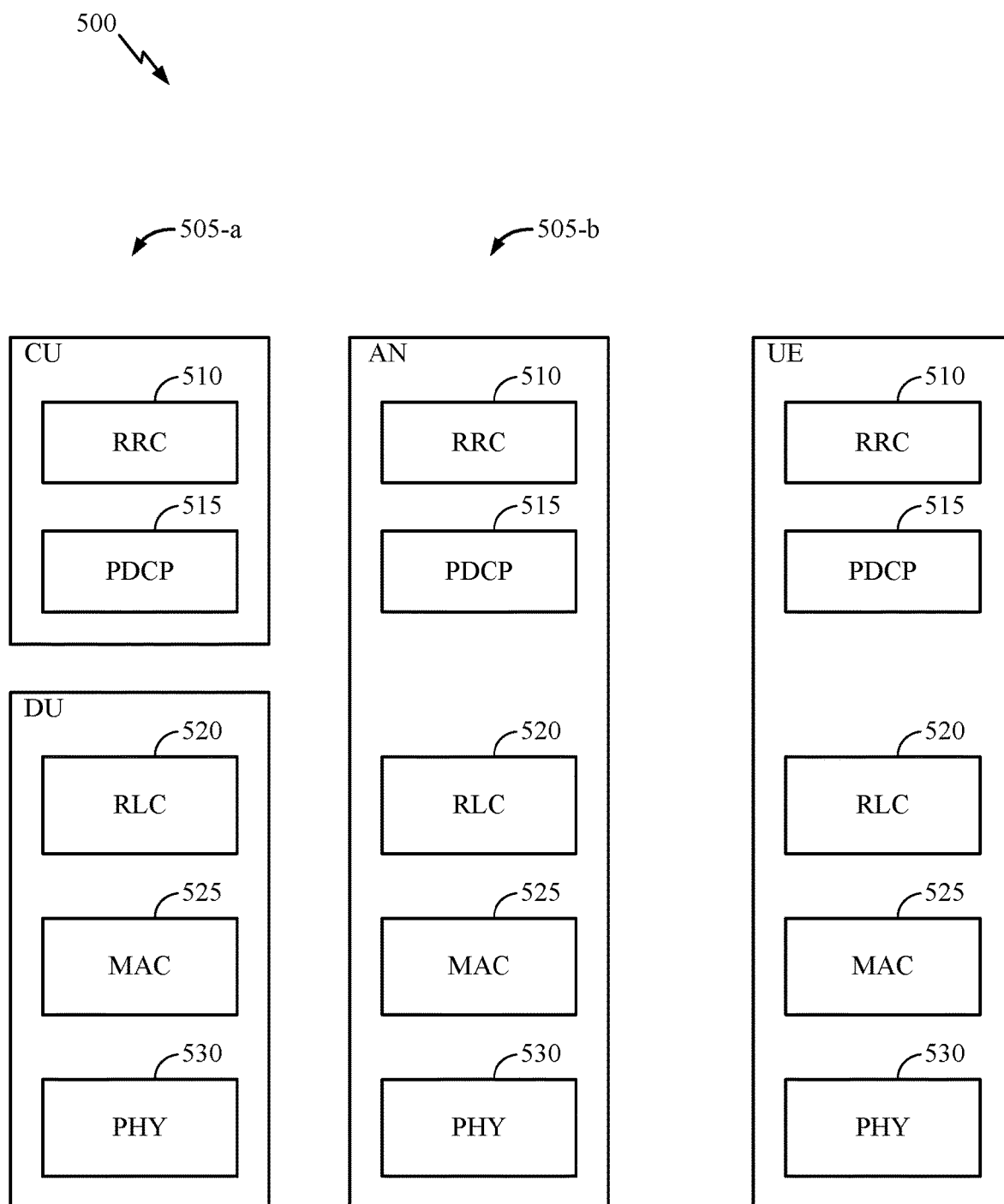
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
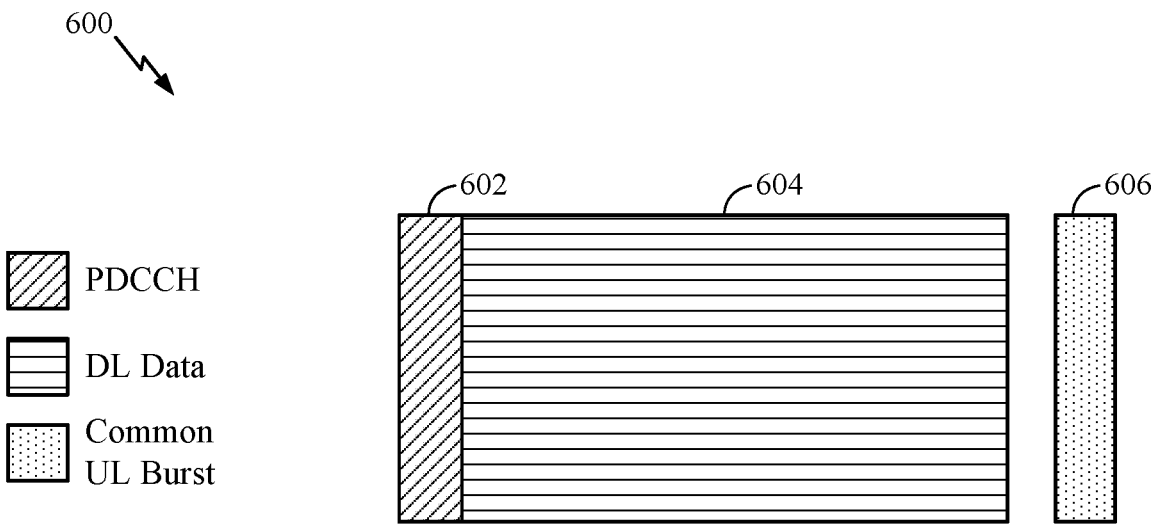
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
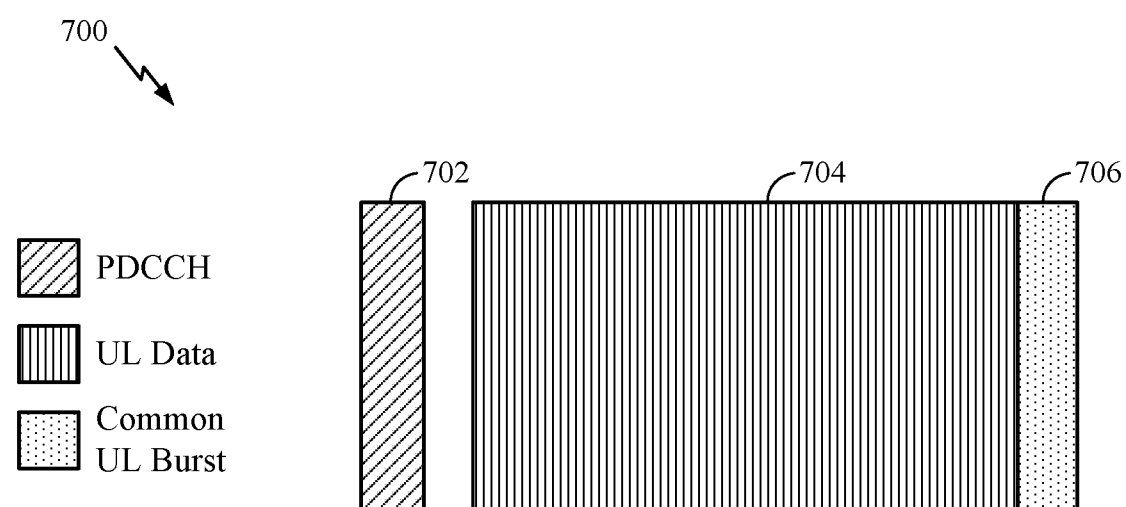
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE UPLINK SPECIFIC BACKOFF
INDICATOR

As discussed, a UE 120 may communicate in a network 100 via a BS 110 that serves the UE 120. In certain aspects, the UE 120 and BS 110 may communicate over a high frequency band (e.g., using mmW). Use of such high frequency bands for communication may lead to link budget limitations (e.g., especially on the UL) meaning that the distance over which the BS 110 and UE 120 can successfully communicate is limited (e.g., the coverage area using such high frequency bands may be smaller than the coverage area using lower frequency bands). For example, use of high frequency bands for communication may lead to larger propagation losses for signals communicated between UE 120 and BS 110 as compared to use of low frequency bands for communication. Such larger propagation losses may mean that the signal quality deteriorates more quickly with respect to distance using high frequency bands as compared to low frequency bands for communication. Further, the UE 120 may have transmit power restrictions for communicating on the UL with BS 110 (e.g., due to electromagnetic field (EMF) exposure limitations) and therefore cannot increase transmit power beyond a certain level to compensate for the increased propagation losses.

In certain aspects, to enhance performance of UL communications by the UE 120 in network 100, in addition to or instead of using the high frequency band for communication on the UL with a BS 110 that serves the UE 120 on the DL, the UE 120 may use a low frequency band for communication on the UL with the same BS 110 that serves UE 120 on the DL and/or a different BS. Such a UL on the low frequency band may be supplemental to the UL on the high frequency band and referred to as a supplementary UL (SUL). Though certain aspects are described with the SUL being on a lower frequency than the UL, the SUL may be on a higher frequency than the UL.

Figure 8:
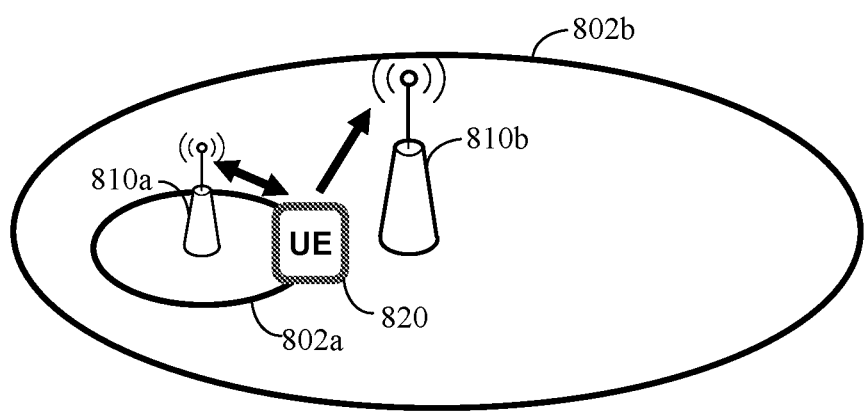
FIG. 8 is a block diagram conceptually illustrating an example telecommunications system, in accordance with certain aspects of the present disclosure.

FIG. 8 is a block diagram conceptually illustrating an example telecommunications system, in accordance with certain aspects of the present disclosure. As shown, BS 810a (e.g., a BS 110) may communicate using one or more high frequency bands and serve a cell 802a by providing DL and UL coverage for UEs in the cell 802a. UE 820 (e.g., a UE 120) may be served by BS 810a in cell 802a. For example, UE 820 may establish a connection (e.g., using a RRC configuration) with BS 810a for communicating with BS 810a on the DL (and potentially also the UL). Depending on the location of UE 820 in cell 802a, the UL channel quality between UE 120 and BS 810a may differ. For example, if the UE 820 is closer to BS 810a (e.g., far from the cell edge of cell 802a) the UL channel quality may be sufficient for UE 820 to efficiently communication on the UL with BS 810a using the one or more high frequency bands. However, if the UE 820 is farther from BS 810a (e.g., close to the cell edge of cell 802a) the UL channel quality may suffer and UE 820 may not be able to efficiently communicate on the UL with BS 810a.

Accordingly, UE 820 may instead or in addition communicate over one or more low frequency bands on a SUL with BS 810a or another BS. In FIG. 8, UE 820 may communicate with BS 810b using one or more low frequency bands. For example, BS 810b may serve a cell 802b using one or more low frequency bands by providing UL coverage (e.g., and also optionally DL coverage) for UEs in the cell 802b. The UE 820 may establish a connection with BS 810b to communicate on a SUL. Since communications on the SUL are using a low frequency band, even if the UE 820 is further from BS 810b than BS 810a, the channel quality on the SUL may be better than the channel quality on the UL between UE 820 and BS 810a. Accordingly, a UE 820 may have different serving cells (e.g., from different BSs or the same BS (not shown)) for communicating on the UL and DL. Though not shown, UE 820 may communicate on a different frequency than the UL on a SUL with BS 810a itself.

In certain aspects, if the high frequency band UL from BS 810a is not available to UE 820 (e.g., due to poor UL channel quality), the UE 820 should be able to access the network utilizing a low frequency band on the UL as discussed. Such access by the UE 820 includes both initial access by UE 820 to the network on the UL, as well as access due to a handover.

In certain aspects, for a UE to initially access (e.g., for initial SUL access, or as a handover target for the SUL) a SUL to communicate with a BS, the UE may perform a RACH procedure based on RACH configuration parameters for the SUL broadcast by the BS in remaining minimum system information (RMSI). The RACH configuration parameters may be specific for the SUL, so that the UE can perform the RACH procedure only for accessing the specific SUL. In certain aspects, the RACH configuration parameters include a threshold that the UE uses to determine whether or not to access the SUL. For example, the UE may monitor DL transmission signals from the BS. The UE may measure the DL transmission signals from the BS. For example, the UE may measure the DL transmission signals (e.g., reference signal(s)) from the BS and determine a signal strength (e.g., received signal strength indication (RSSI), reference signal received power (RSRP), reference signal received quality (RSRQ)) of the DL transmission signals. If the signal strength of the DL transmission signals satisfies the threshold (e.g., is lower than the threshold), the UE selects the SUL for initial access, and performs the RACH procedure to access the SUL. Otherwise, the UE may not select the SUL for initial access, and not perform the RACH procedure to access the SUL.

Accordingly, in certain aspects, a UE 120 may try and communicate with a BS 110 utilizing a random access procedure (e.g., also referred to as a RACH procedure for communicating with the BS 110 on a RACH) to access a SUL of BS 110. The UE 120 may be configured to make RACH attempts to achieve UL synchronization with the BS 110 on a SUL as discussed. RACH procedures may include contention-based RACH procedures and/or contention-free RACH procedures. It should be noted that certain aspects discussed herein may be applicable to one or both of contention-based RACH procedures and contention-free RACH procedures.

In certain aspects, as part of a RACH procedure, UE 120 may initially transmit to BS 110 a preamble. The UE 120 may select the preamble from a plurality of possible preambles reserved for RACH. The BS 110 may, in response, transmit a random access response (RAR) to the UE 120 (e.g., on PDSCH) in a media access control (MAC) RAR protocol data unit (PDU). The RAR may indicate the identity of the detected preamble, a timing alignment instruction to synchronize subsequent SUL transmissions from the UE 120, an initial SUL resource grant (e.g., resources granted to the UE 120 for SUL transmission to the BS 110), etc. The UE 120 can then utilize the granted resources to communicate with the BS 110 on the SUL. A MAC RAR PDU may include multiple RARs (e.g., for different UEs 120), and a header of the MAC RAR PDU may include a separate subheader for each RAR in the MAC RAR PDU.

In certain cases, the MAC RAR PDU may include a backoff indicator (BI) that instructs to the UEs 120 receiving a RAR in the MAC RAR PDU to backoff for a period of time before retrying a RACH procedure. For example, the network may be congested and many UEs 120 may be communicating with the BS 110 on the SUL. Accordingly, the BS 110 may be unable to grant SUL resources to the UE 120 for the UE 120 to communicate with the BS 110 on the SUL. To prevent the UE 120 from immediately again trying to perform a RACH and wasting network resources, the BS 110 may send a BI to the UE 120 so that it does not retry the RACH procedure immediately and inform the UE 120 to wait a duration before trying the RACH procedure again.

In certain aspects, the BI is included in a special MAC subheader of the header of the MAC RAR PDU that includes a BI filed that carries the BI parameter. The MAC header for MAC RAR PDU may be a variable size header that includes an extension (E) field, type (T) field, one or more reserved bits (R), random access preamble identifier (RAPID), and/or the BI field. The E field may be a flag that indicates if more fields are present in the MAC header or not. If the E field is set to "1", it may indicate that at least another set of E, T, and RAPID fields follow the E field. If the E field is set to "0", it may indicate that a RAR or padding starts at the next byte. The T field may be a flag indication whether the MAC subheader includes a RAPID or a BI. If the T field is set to "0", the MAC subheader includes a BI. If the T field is set to "1", the MAC subheader includes a RAPID.

In certain aspects, the BI field may be 4 bits and may have an index value that from 0-15. The index values may map to different backoff parameter values (e.g., in ms). The actual time that a UE 120 may backoff may be chosen by the UE in the interval of 0 to the backoff parameter value, meaning the time period the UE 120 backs off may be based on the BI, but not deterministic for a given BI value.

In certain aspects, as discussed, UE 120 may have multiple uplinks (e.g., a UL and a SUL) with one or more BSs 110 and a single DL. The UE 120, accordingly, may be configured to be able to perform random access procedures with any of the multiple uplinks, such as the UL and the SUL. As discussed, if there is congestion on one of the uplinks, the network (e.g., via BS 110) should be able to indicate the congestion to the UE 120 for the uplink, such as using a BI. In certain aspects, techniques are provided herein for indicating a BI to the UE 120 that is specific to a particular uplink and applied by the UE 120 for performing RACH for the particular uplink, and not any other uplinks of the UE 120.

Conventionally, as discussed, the BI is included in a MAC subheader of the MAC RAR PDU. The BI, however, does not conventionally include an index to identify a particular uplink of multiple uplinks. Further, the BI is conventionally multiplexed with any of the RARs included in the MAC RAR PDU, regardless of which uplink the RAR is for. Therefore, if the UE 120 were to receive a conventional MAC RAR PDU with a conventional BI, it would not be able to determine to which uplink of multiple uplinks the BI applies and have to apply it to all uplinks, which may mean that it backs off from not congested uplinks, or does not back off from a congested uplink, which can hurt performance.

Accordingly, in certain aspects, a BS 110 is configured to generate a MAC RAR PDU with a BI, where any RARs included in the MAC RAR PDU are for a specific uplink, and cannot be for different uplinks than the specific uplink. The MAC RAR PDU, therefore, can be associated with a random access-radio network temporary identifier (RA-RNTI) that is calculated based at least in part on an index of the specific uplink, as the RA-RNTI can be for the specific uplink since all the RARs in the MAC RAR PDU are for the specific uplink. The UE 120, thus, can determine which uplink the BI is for based on determining the RA-RNTI associated with the MAC RAR PDU that includes the BI. In particular, the UE 120 can determine the specific uplink associated with the RA-RNTI that is associated with the MAC RAR PDU, and determine that the BI in the MAC RAR PDU is therefore for the specific uplink.

In particular, the BS 110 may be configured to scramble a downlink assignment transmitted on the downlink (e.g., scramble a cyclic redundancy check (CRC) of the downlink assignment transmitted on PDCCH), with a particular RA-RNTI that is calculated based at least in part on an index of the specific uplink. The downlink assignment may indicate a downlink assignment for transmission of the MAC RAR PDU by the BS 110 (e.g., on PDSCH), meaning it indicates the transmission of the MAC RAR PDU. In order for the UE 120 to be able to receive the MAC RAR PDU, the UE 120 may need the downlink assignment, and therefore be able to descramble the downlink assignment. For the UE 120 to be able to descramble the downlink assignment, therefore, it needs the correct RA-RNTI used to scramble the downlink assignment. If the UE 120 does not have the correct RA-RNTI, the UE 120 cannot descramble the downlink assignment and will not receive the MAC RAR PDU. However, if the UE 120 is able to descramble the downlink assignment, it determines the specific uplink with which the RA-RNTI used to descramble the downlink assignment is associated, and determines the BI included in the MAC RAR PDU is for the specific uplink.

In certain aspects, a BS 110 is configured to generate a MAC RAR PDU with one or more BIs, where RARs for different uplinks can be included in the MAC RAR PDU. However the RARs for a given uplink are grouped together in the MAC RAR PDU. For example, where the RARs are for a UL and a SUL, the UL RARs are grouped together in the MAC RAR PDU, and the SUL RARs are grouped together in the MAC RAR PDU, and the RARs for the different uplinks are not mixed together. A grouping of RARs for an uplink may be referred to as a RAR segment. In certain aspects, a separate BI for each uplink is positioned in the MAC RAR PDU along with the RAR segment for the particular uplink. For example, the BI may be positioned at the beginning of the RAR segment, at the end of the RAR segment, or within the RAR segment. The position of the BI with respect to the RAR segment may be known by the BS 110 and the UE 120, so the BS 110 can properly generate the MAC RAR PDU, and the UE 120 can determine which BI is associated with which RAR segment.

Further, the ordering of the RAR segments for uplinks may be known by the BS 110 and UE 120, so the BS 110 can properly generate the MAC RAR PDU, and the UE 120 can determine which RAR segment is associated with which uplink. For example, the RAR segments may be ordered in the MAC RAR PDU according to the index value of the corresponding uplinks. The RAR segments may be ordered with UL first followed by SUL, or vice versa.

In certain aspects, the MAC subheader of the MAC RAR PDU used for carrying BI may include one or more (e.g., 2) reserved bits. In certain aspects, one or more (e.g., 1) of the reserved bits may be used to indicate an index of an uplink the BI is associated with. The BS 110, accordingly, may include one or more MAC subheaders that include BI in a MAC RAR PDU, and further may indicate in each of the one or more MAC subheaders the uplink associated with the BI. The UE 120 may receive the MAC RAR PDU, and determine the uplink associated with a particular BI based on the value indicating the uplink in the MAC subheader that includes the BI.

It should be noted that the UE 120 and BS 110 may be configured to use one of the types of MAC RAR PDU discussed herein, or multiple. If multiple, the UE 120 and BS 110 may exchange communications to configure which MAC RAR PDU type to use.

Figure 9:
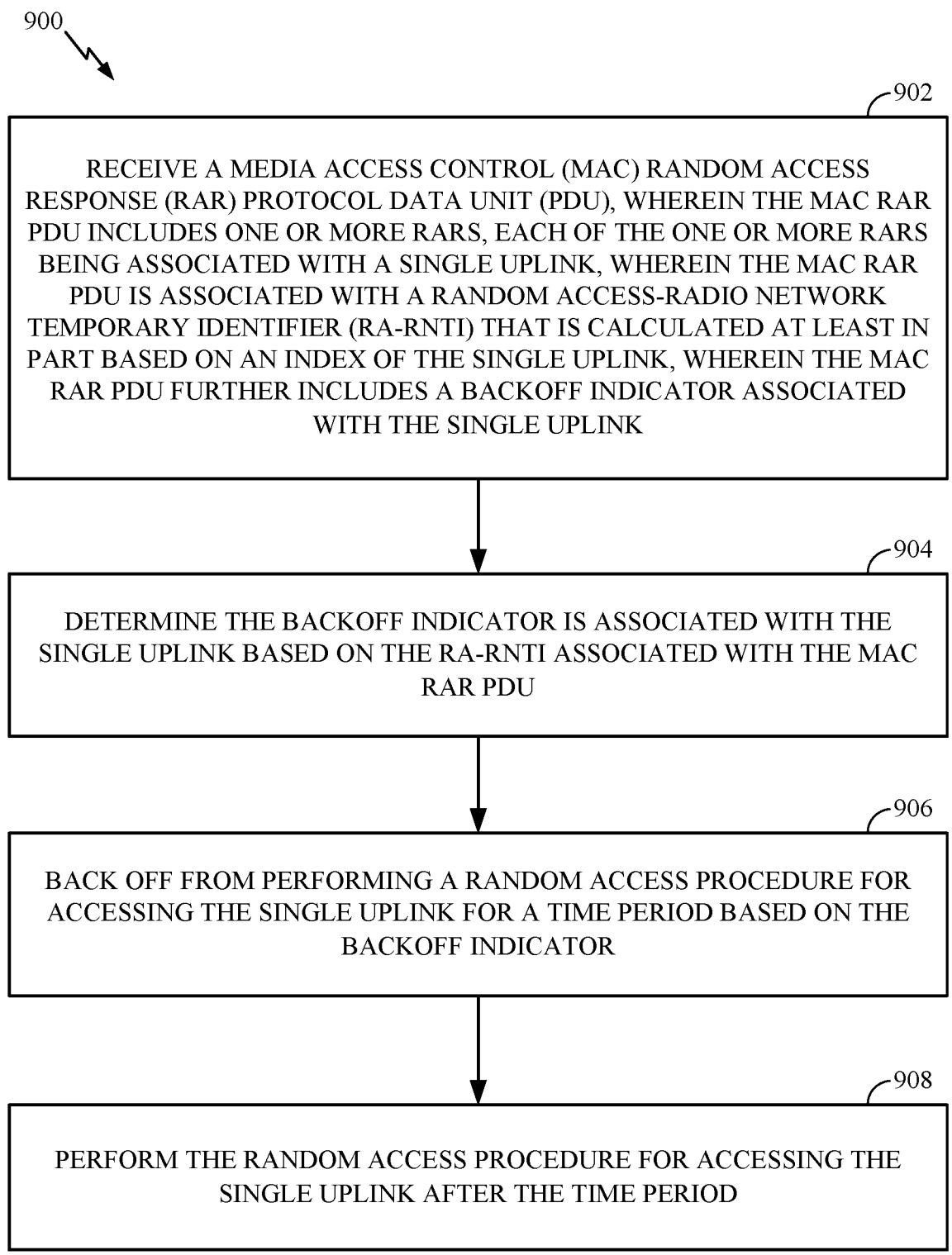
FIG. 9 illustrates example operations that may be performed by a wireless device such as a user equipment (UE) for performing a RACH procedure with a BS in accordance with aspects of the present disclosure.

FIG. 9 illustrates example operations 900 that may be performed by a wireless device such as a user equipment (UE) (e.g., UE 120) for performing a RACH procedure with a BS (e.g., BS 110) in accordance with aspects of the present disclosure. A BS may be configured to perform complementary operations.

Operations 900 begin, at 902, by a UE receiving from a base station, a media access control (MAC) random access response (RAR) protocol data unit (PDU). The MAC RAR PDU includes one or more RARs, each of the one or more RARs being associated with a single uplink. The MAC RAR PDU is associated with a random access-radio network temporary identifier (RA-RNTI) that is calculated at least in part based on an index of the single uplink. The MAC RAR PDU further includes a backoff indicator associated with the single uplink. At 904, the UE determines the backoff indicator is associated with the single uplink based on the RA-RNTI associated with the MAC RAR PDU. At 906 the UE backs off from performing a random access procedure for accessing the single uplink for a time period based on the backoff indicator. At 908, the UE performs the random access procedure for accessing the single uplink after the time period.

Figure 10:
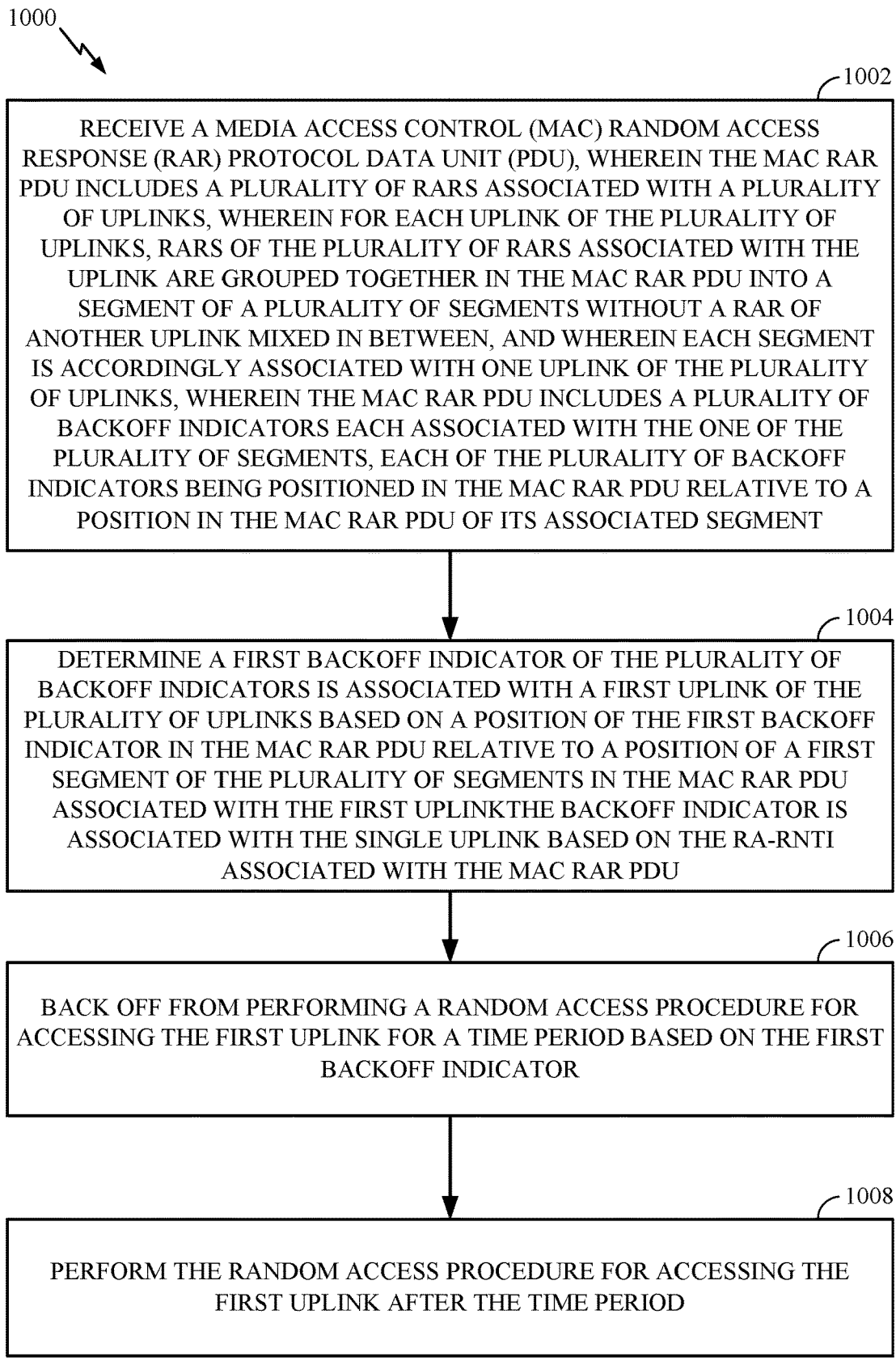
FIG. 10 illustrates example operations that may be performed by a wireless device such as a user equipment (UE) for performing a RACH procedure with a BS in accordance with aspects of the present disclosure.

FIG. 10 illustrates example operations 1000 that may be performed by a wireless device such as a user equipment (UE) (e.g., UE 120) for performing a RACH procedure with a BS (e.g., BS 110) in accordance with aspects of the present disclosure. A BS may be configured to perform complementary operations.

Operations 1000 begin, at 1002, by a UE receiving, by a user equipment from a base station, a media access control (MAC) random access response (RAR) protocol data unit (PDU). The MAC RAR PDU includes a plurality of RARs associated with a plurality of uplinks. For each uplink of the plurality of uplinks, RARs of the plurality of RARs associated with the uplink are grouped together in the MAC RAR PDU into a segment of a plurality of segments without a RAR of another uplink mixed in between. Each segment is accordingly associated with one uplink of the plurality of uplinks. The MAC RAR PDU includes a plurality of backoff indicators each associated with the one of the plurality of segments, each of the plurality of backoff indicators being positioned in the MAC RAR PDU relative to a position in the MAC RAR PDU of its associated segment. At 1004, the UE determines a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink. At 1006 the UE backs off from performing a random access procedure for accessing the first uplink for a time period based on the first backoff indicator. At 1008, the UE performs the random access procedure for accessing the first uplink after the time period.

Figure 11:
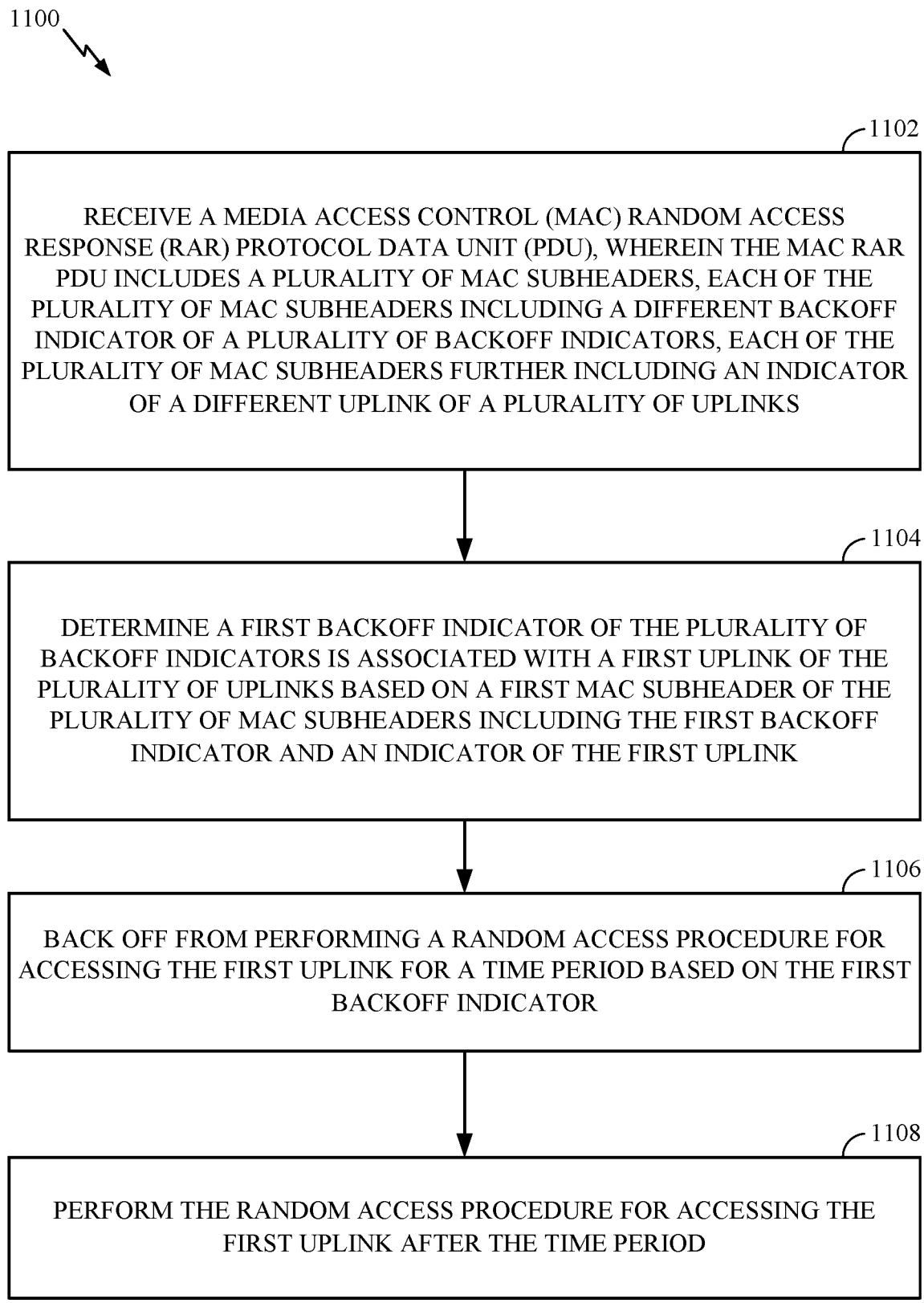
FIG. 11 illustrates example operations that may be performed by a wireless device such as a user equipment (UE) for performing a RACH procedure with a BS in accordance with aspects of the present disclosure.

FIG. 11 illustrates example operations 1100 that may be performed by a wireless device such as a user equipment (UE) (e.g., UE 120) for performing a RACH procedure with a BS (e.g., BS 110) in accordance with aspects of the present disclosure. A BS may be configured to perform complementary operations.

Operations 1100 begin, at 1102, by a UE receiving a media access control (MAC) random access response (RAR) protocol data unit (PDU). The MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks. At 1104, the UE determines a first backoff indicator of the plurality of backoff indicators is associated with a first uplink of the plurality of uplinks based on a first MAC subheader of the plurality of MAC subheaders including the first backoff indicator and an indicator of the first uplink. At 1106 the UE backs off from performing a random access procedure for accessing the first uplink for a time period based on the first backoff indicator. At 1108, the UE performs the random access procedure for accessing the first uplink after the time period.

Figure 12:
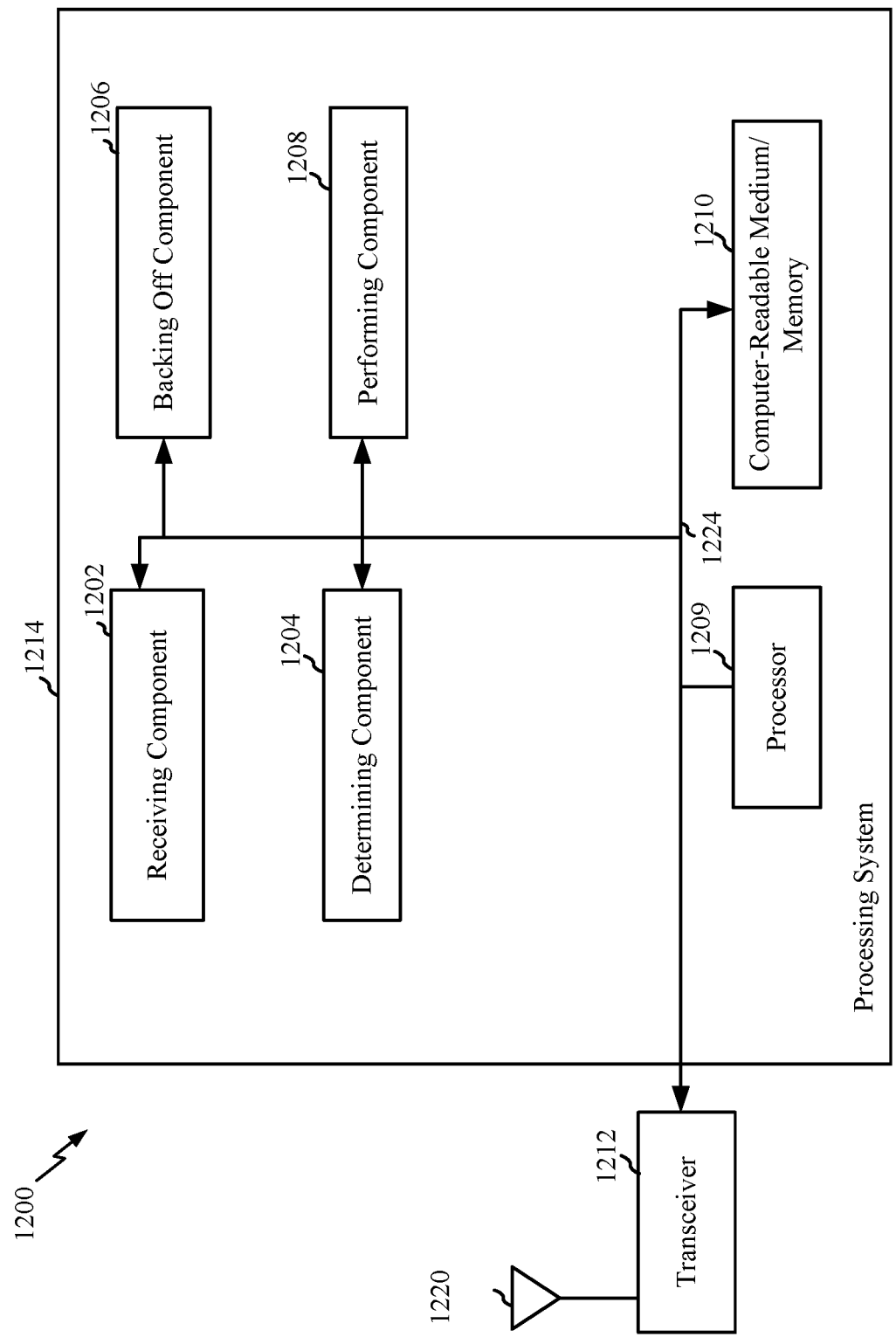
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as one or more of the operations illustrated in FIGS. 9-11. The communications device 1200 includes a processing system 1214 coupled to a transceiver 1212. The transceiver 1212 is configured to transmit and receive signals for the communications device 1200 via an antenna 1220, such as the various signals described herein. The processing system 1214 may be configured to perform processing functions for the communications device 1200, including processing signals received and/or to be transmitted by the communications device 1200.

The processing system 1214 includes a processor 1209 coupled to a computer-readable medium/memory 1210 via a bus 1224. In certain aspects, the computer-readable medium/memory 1210 is configured to store instructions that when executed by processor 1209, cause the processor 1209 to perform one or more of the operations illustrated in FIGS. 9-11, or other operations for performing the various techniques discussed herein.

In certain aspects, the processing system 1214 further includes a receiving component 1202 for performing one or more of the operations illustrated at 902, 1002, or 1102 in FIGS. 9-11, respectively. Additionally, the processing system 1214 includes a determining component 1204 for performing one or more of the operations illustrated at 904, 1004, or 1104 in FIGS. 9-11, respectively. The processing system 1214 also includes a backing off component 1206 for performing one or more of the operations illustrated at 906, 1006, or 1106 in FIGS. 9-11, respectively. The processing system 1214 further includes a performing component 1208 for performing one or more of the operations illustrated at 908, 1008, or 1108 in FIGS. 9-11, respectively.

The receiving component 1202, determining component 1204, backing off component 1206, and performing component 1208 may be coupled to the processor 1209 via bus 1224. In certain aspects, the receiving component 1202, determining component 1204, backing off component 1206, and performing component 1208 may be hardware circuits. In certain aspects, the receiving component 1202, determining component 1204, backing off component 1206, and performing component 1208 may be software components that are executed and run on processor 1209.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:
  receiving, by a user equipment, a downlink assignment for a media access control (MAC) random access response (RAR) protocol data unit (PDU), wherein the downlink assignment is scrambled with a random access-radio network temporary identifier (RA-RNTI) that is calculated at least in part based on an index of a single uplink;
  receiving, by the user equipment from a base station, the MAC RAR PDU, wherein the MAC RAR PDU includes one or more RARs, each of the one or more RARs being associated with the single uplink, wherein the MAC RAR PDU is associated with the RA-RNTI, wherein the MAC RAR PDU further includes a backoff indicator associated with the single uplink;
  determining, by the user equipment, that the MAC RAR PDU is associated with the RA-RNTI based on the downlink assignment;
  determining, by the user equipment, the backoff indicator is associated with the single uplink based on the RA-RNTI associated with the MAC RAR PDU;
  backing off, by the user equipment, from performing a random access procedure for accessing the single uplink for a time period based on the backoff indicator; and
  performing, by the user equipment, the random access procedure for accessing the single uplink after the time period.

2. The method of claim 1, wherein the downlink assignment is received on a physical downlink control channel (PDCCH), and the MAC RAR PDU is received on a physical downlink shared channel (PDSCH).

3. A method for wireless communication, the method comprising:
  receiving, by a user equipment from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment;
  determining, by the user equipment, a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink;
  backing off, by the user equipment, from performing a random access procedure for accessing the first uplink for a time period based on the first backoff indicator; and
  performing, by the user equipment, the random access procedure for accessing the first uplink after the time period.

4. The method of claim 3, wherein the first backoff indicator is positioned at the beginning of the first segment.

5. The method of claim 3, wherein the first backoff indicator is positioned at one of the back of or within the first segment.

6. The method of claim 3, wherein each of the plurality of segments are ordered in the MAC RAR PDU based on an index of its associated uplink.

7. A method for wireless communication, the method comprising:
  receiving, by a user equipment from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks;
  determining, by the user equipment, a first backoff indicator of the plurality of backoff indicators is associated with a first uplink of the plurality of uplinks based on a first MAC subheader of the plurality of MAC subheaders including the first backoff indicator and an indicator of the first uplink, wherein the first MAC subheader includes a reserved field, wherein the indicator of the first uplink is included in the reserved field;

backing off, by the user equipment, from performing a random access procedure for accessing the first uplink for a time period based on the first backoff indicator; and performing, by the user equipment, the random access procedure for accessing the first uplink after the time period.

8. The method of claim 7, wherein each of the plurality of MAC subheaders further including an indicator of a different uplink of a plurality of uplinks comprises each of the plurality of MAC subheaders further including an index of a different uplink of a plurality of uplinks.

9. A user equipment comprising:
a memory; and
a processor coupled to the memory, the processor being configured to:
receive a downlink assignment for a media access control (MAC) random access response (RAR) protocol data unit (PDU), wherein the downlink assignment is scrambled with a random access-radio network temporary identifier (RA-RNTI) that is calculated at least in part based on an index of a single uplink,
receive, from a base station, the MAC RAR PDU, wherein the MAC RAR PDU includes one or more RARs, each of the one or more RARs being associated with the single uplink, wherein the MAC RAR PDU is associated with the RA-RNTI, wherein the MAC RAR PDU further includes a backoff indicator associated with the single uplink;
determine that the MAC RAR PDU is associated with the RA-RNTI based on the downlink assignment;
determine the backoff indicator is associated with the single uplink based on the RA-RNTI associated with the MAC RAR PDU;
back off from performing a random access procedure for accessing the single uplink for a time period based on the backoff indicator; and
perform the random access procedure for accessing the single uplink after the time period.

10. The user equipment of claim 9, wherein the downlink assignment is received on a physical downlink control channel (PDCCH), and the MAC RAR PDU is received on a physical downlink shared channel (PDSCH).

11. A user equipment comprising:
a memory; and
a processor coupled to the memory, the processor being configured to:
receive, from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment;
determine a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink;
back off from performing a random access procedure for accessing the first uplink for a time period based on the first backoff indicator; and
perform the random access procedure for accessing the first uplink after the time period.

12. The user equipment of claim 11, wherein the first backoff indicator is positioned at the beginning of the first segment.

13. The user equipment of claim 11, wherein the first backoff indicator is positioned at one of the back of or within the first segment.

14. The user equipment of claim 11, wherein each of the plurality of segments are ordered in the MAC RAR PDU based on an index of its associated uplink.

15. A user equipment comprising:
a memory; and
a processor coupled to the memory, the processor being configured to:
receive, from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks;
determine a first backoff indicator of the plurality of backoff indicators is associated with a first uplink of the plurality of uplinks based on a first MAC subheader of the plurality of MAC subheaders including the first backoff indicator and an indicator of the first uplink, wherein the first MAC subheader includes a reserved field, wherein the indicator of the first uplink is included in the reserved field;
back off from performing a random access procedure for accessing the first uplink for a time period based on the first backoff indicator; and
perform the random access procedure for accessing the first uplink after the time period.

16. The user equipment of claim 15, wherein each of the plurality of MAC subheaders further including an indicator of a different uplink of a plurality of uplinks comprises each of the plurality of MAC subheaders further including an index of a different uplink of a plurality of uplinks.

17. A non-transitory computer readable medium having instructions stored thereon for causing a user equipment to perform a method for wireless communication, the method comprising:
receiving, by the user equipment, a downlink assignment for a media access control (MAC) random access response (RAR) protocol data unit (PDU), wherein the downlink assignment is scrambled with a random access-radio network temporary identifier (RA-RNTI) that is calculated at least in part based on an index of a single uplink;
receiving, by the user equipment from a base station, the MAC RAR PDU, wherein the MAC RAR PDU includes one or more RARs, each of the one or more RARs being associated with the single uplink, wherein the MAC RAR PDU is associated with the RA-RNTI, wherein the MAC RAR PDU further includes a backoff indicator associated with the single uplink;

determining, by the user equipment, that the MAC RAR PDU is associated with the RA-RNTI based on the downlink assignment;

determining, by the user equipment, the backoff indicator is associated with the single uplink based on the RA-RNTI associated with the MAC RAR PDU;

backing off, by the user equipment, from performing a random access procedure for accessing the single uplink for a time period based on the backoff indicator; and performing, by the user equipment, the random access procedure for accessing the single uplink after the time period.

18. A non-transitory computer readable medium having instructions stored thereon for causing a user equipment to perform a method for wireless communication, the method comprising:

receiving, by the user equipment from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment;

determining, by the user equipment, a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink;

backing off, by the user equipment, from performing a random access procedure for accessing the first uplink for a time period based on the first backoff indicator; and performing, by the user equipment, the random access procedure for accessing the first uplink after the time period.

19. A non-transitory computer readable medium having instructions stored thereon for causing a user equipment to perform a method for wireless communication, the method comprising:

receiving, by the user equipment from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks;

determining, by the user equipment, a first backoff indicator of the plurality of backoff indicators is associated with a first uplink of the plurality of uplinks based on a first MAC subheader of the plurality of MAC subheaders including the first backoff indicator and an indicator of the first uplink, wherein the first MAC subheader includes a reserved field, wherein the indicator of the first uplink is included in the reserved field;

backing off, by the user equipment, from performing a random access procedure for accessing the first uplink for a time period based on the first backoff indicator; and performing, by the user equipment, the random access procedure for accessing the first uplink after the time period.

20. A user equipment comprising:

means for receiving a downlink assignment for a media access control (MAC) random access response (RAR) protocol data unit (PDU), wherein the downlink assignment is scrambled with a random access-radio network temporary identifier (RA-RNTI) that is calculated at least in part based on an index of a single uplink;

means for receiving, from a base station, the MAC RAR PDU, wherein the MAC RAR PDU includes one or more RARs, each of the one or more RARs being associated with the single uplink, wherein the MAC RAR PDU is associated with the RA-RNTI, wherein the MAC RAR PDU further includes a backoff indicator associated with the single uplink;

means for determining that the MAC RAR PDU is associated with the RA-RNTI based on the downlink assignment;

means for determining the backoff indicator is associated with the single uplink based on the RA-RNTI associated with the MAC RAR PDU;

means for backing off, by the user equipment, from performing a random access procedure for accessing the single uplink for a time period based on the backoff indicator; and means for performing, by the user equipment, the random access procedure for accessing the single uplink after the time period.

21. A user equipment comprising:

means for receiving, from a base station, a media access control (MAC) random access response (RAR) protocol data unit (PDU), wherein the MAC RAR PDU includes a plurality of RARs associated with a plurality of uplinks, wherein for each uplink of the plurality of uplinks, RARs of the plurality of RARs associated with the uplink are grouped together in the MAC RAR PDU into a segment of a plurality of segments without a RAR of another uplink mixed in between, and wherein each segment is accordingly associated with one uplink of the plurality of uplinks, wherein the MAC RAR PDU includes a plurality of backoff indicators each associated with the one of the plurality of segments, each of the plurality of backoff indicators being positioned in the MAC RAR PDU relative to a position in the MAC RAR PDU of its associated segment;

means for determining a first backoff indicator of the plurality of backoff indicators is associated with a first uplink of the plurality of uplinks based on a position of the first backoff indicator in the MAC RAR PDU relative to a position of a first segment of the plurality of segments in the MAC RAR PDU associated with the first uplink;

means for backing off from performing a random access procedure for accessing the first uplink for a time period based on the first backoff indicator; and means for performing the random access procedure for accessing the first uplink after the time period.

22. A user equipment comprising:
- means for receiving, from a base station, a media access control (MAC) random access response (RAR) protocol data unit (PDU), wherein the MAC RAR PDU includes a plurality of MAC subheaders, each of the plurality of MAC subheaders including a different backoff indicator of a plurality of backoff indicators, each of the plurality of MAC subheaders further including an indicator of a different uplink of a plurality of uplinks;
- means for determining a first backoff indicator of the plurality of backoff indicators is associated with a first uplink of the plurality of uplinks based on a first MAC subheader of the plurality of MAC subheaders including the first backoff indicator and an indicator of the first uplink, wherein the first MAC subheader includes a reserved field, wherein the indicator of the first uplink is included in the reserved field;
- means for backing off from performing a random access procedure for accessing the first uplink for a time period based on the first backoff indicator; and
- means for performing the random access procedure for accessing the first uplink after the time period.

* * * * *